United States Patent
Ziegler et al.

(10) Patent No.: US 7,059,658 B2
(45) Date of Patent: Jun. 13, 2006

(54) MULTI-LAYERED INSIDE LINING PIECE

(75) Inventors: Michael Ziegler, Penzberg (DE); Dirk Dykerhoff, Seeshaupt (DE); Stefan Riesinger, Wolfratshausen (DE)

(73) Assignee: Findlay Industries Deutschland GmbH, Geretsried (DE)

( * ) Notice: Subject to any disclaimer, the term of this patent is extended or adjusted under 35 U.S.C. 154(b) by 0 days.

(21) Appl. No.: 10/363,890

(22) PCT Filed: Sep. 1, 2001

(86) PCT No.: PCT/EP01/10106

§ 371 (c)(1),
(2), (4) Date: Nov. 6, 2003

(87) PCT Pub. No.: WO02/20312

PCT Pub. Date: Mar. 14, 2002

(65) Prior Publication Data

US 2004/0100120 A1 May 27, 2004

(30) Foreign Application Priority Data

Sep. 9, 2000 (DE) ................ 100 44 760

(51) Int. Cl.
B60J 5/00 (2006.01)

(52) U.S. Cl. .................... 296/146.7; 49/502

(58) Field of Classification Search ............. 296/146.7; 49/502
See application file for complete search history.

(56) References Cited

U.S. PATENT DOCUMENTS

| 4,791,019 A | | 12/1988 | Ohta et al. |
| 5,180,617 A | | 1/1993 | Takeuchi et al. |
| 5,674,445 A | | 10/1997 | Van Ert |
| 5,695,865 A | * | 12/1997 | Shimizu ............... 428/212 |
| 6,139,088 A | * | 10/2000 | Okamoto et al. ........ 296/146.6 |
| 6,183,038 B1 | * | 2/2001 | Hansen et al. ......... 296/146.7 |
| 6,185,872 B1 | * | 2/2001 | Seeberger et al. .......... 49/502 |
| 6,296,296 B1 | * | 10/2001 | Sekishiro et al. ........ 296/146.7 |
| 6,358,138 B1 | * | 3/2002 | Alder .................... 454/124 |
| 6,438,899 B1 | * | 8/2002 | Feder et al. ................. 49/502 |
| 6,640,500 B1 | * | 11/2003 | Stout ........................ 49/502 |

FOREIGN PATENT DOCUMENTS

| DE | 32 33 675 A1 | 3/1984 |
| DE | 44 47 645 C2 | 3/1996 |
| DE | 195 05 214 A1 | 8/1996 |
| EP | 0 188 680 A2 | 7/1986 |
| EP | 0 348 357 A2 | 12/1989 |
| EP | 0 686 531 A1 | 12/1995 |
| EP | 0 732 182 A2 | 9/1996 |
| EP | 0 794 875 | 9/1997 |

OTHER PUBLICATIONS

Müller, "PURe Natur im Automobil", Kunststoffe 88, pp. 544-546, (1998)4.

* cited by examiner

*Primary Examiner*—Dennis H. Pedder
(74) *Attorney, Agent, or Firm*—Venable LLP; Thomas G. Wiseman

(57) ABSTRACT

A multishell interior trim part for a side door of a passenger car consists of a function carrier interior shell (1) of a polypropylene, epoxy resin or polyurethane reinforced by natural fibers, and an outer shell (10) which partially or completely covers the interior shell (1) as seen by the passengers.

12 Claims, 2 Drawing Sheets

MULTI-LAYERED INSIDE LINING PIECE

BACKGROUND OF THE INVENTION

1. Field of the Invention

The invention relates to a multishell interior trim part for a side door of a passenger car.

2. Description of the Related Art

From DE 44 00 388 C2, a method and a device for preparing a molded part from at least one support layer and backing layer are known. The method for preparing this molded part, especially a trim part for a motor vehicle, from at least one support layer and a backing layer in which the flat layers are oriented on one another in parallel extension and their edges are kept in a mutual distance while the edge of the support layer is severed off to form a worked border, and the layers are pressed together between two mold surfaces to become mutually bonded, whereupon the edge of the backing layer protruding outwards opposite to the worked border of the support layer is bent over around the worked border of the support layer and engaged to the back side of the support layer and attached thereto, is characterized in that, immediately after the severing of the edge of the support layer and the pressing together of the two layers, the protruding edge of the backing layer is bent over around the worked border and pressed against the back side of the support layer while the molded part is still positioned with its front side against the assigned mold surface.

The above method is very expensive and involves a high cut-off amount of the material of the support layer.

DE 199 37 000 A1, published on Feb. 8, 2001, relates to a support element for receiving functional units in motor vehicle doors and a method for its preparation. A support element for receiving functional units of a motor vehicle door which is connectable to a supporting part of the motor vehicle door at least partially consists of a foamed plastic. The support element is prepared from a foam part having a foam core of low density and a compact exterior skin in a thermoplastic foam pouring method using plastic pellets with the addition of an endothermally or exothermally reacting foaming agent, or from a foam part using an expanding polypropylene or an expanding polyethylene.

In contrast, DE 44 47 645 C2 describes a method for preparing a molded part, especially an interior trim or the like for motor vehicles. The molded part is prepared from a non-woven mat preimpregnated with a thermoplastic resin, in which the non-woven mat is heated two-dimensionally and predensified in a contact heating press beyond the softening temperature of the thermoplastic resin, and pressing is effected onto this non-woven mat under a high pressure and a temperature of, for example, from 100 to 130° C. in a hot-press mold, and the compressed molded part is cooled in at least one cooling stage. In said at least one cooling stage, a contact pressure between the cooling mold and the molded part is maintained. Subsequently, a sheet or other decorative material is laminated onto the compressed molded part, wherein said sheet or other decorative material and the surface to be laminated of the molded part are heated by contact heat and placed against each other under a low pressure, whereupon the compressed molded part provided with said laminating sheet and other decorative material is cooled.

The above mentioned decorative trims have a continuous exterior optical appearance which is characterized, in particular, by the single-coloredness of the surface.

BRIEF SUMMARY OF THE INVENTION

In contrast, the object of the present invention, on the one hand, is to enhance the optical quality of the interior trim by multicoloredness, high-quality surfaces, plain elegant designs and/or pronounced transitions and joints.

An additional object of the present invention is to provide an interior trim part for a side door of a passenger car which can have additional illumination and additional useful stowage space.

Particular importance is attached to comfort due to soft surfaces. Also, a corresponding interior trim part should satisfy high demands for passenger protection.

The present object is achieved by a multishell structure of the door trim, wherein the outer shell 10 and the function carrier interior shell 1 serve different functions.

Accordingly, a first embodiment of the present invention is a multishell trim part for a side door of a passenger car which is characterized in that the door trim consists of a function carrier interior shell 1 of a polypropylene, epoxy resin or polyurethane reinforced by natural fibers, and an outer shell 10 which partially or completely covers said interior shell as seen by the passengers.

According to the invention, the function carrier interior shell 1 satisfies the functions towards the metal body and thus contains the retainers necessary for attachment and the inset functions of a door trim.

At the same time, the function carrier interior shell 1 serves a stiffening function in the upper door trim or arm rest area. Parts 2, 3, 4 of the function carrier interior shell 1 serve as a viewing side in the door mirror area and map pocket area. In these surface areas, the function carrier interior shell 1 is preferably provided with a decorative sheet including fabrics, textiles, natural and artificial leather.

In addition, the function carrier interior shell 1 to be employed according to the invention may also adopt crash and acoustic functions.

In contrast, the outer shell 10 essentially serves the function of exhibiting the viewing side as a design or sheer draft surface, and preferably serves to receive the bolt-on parts, such as door release handle, control elements etc.

DETAILED DESCRIPTION OF THE INVENTION

Figure 1A:
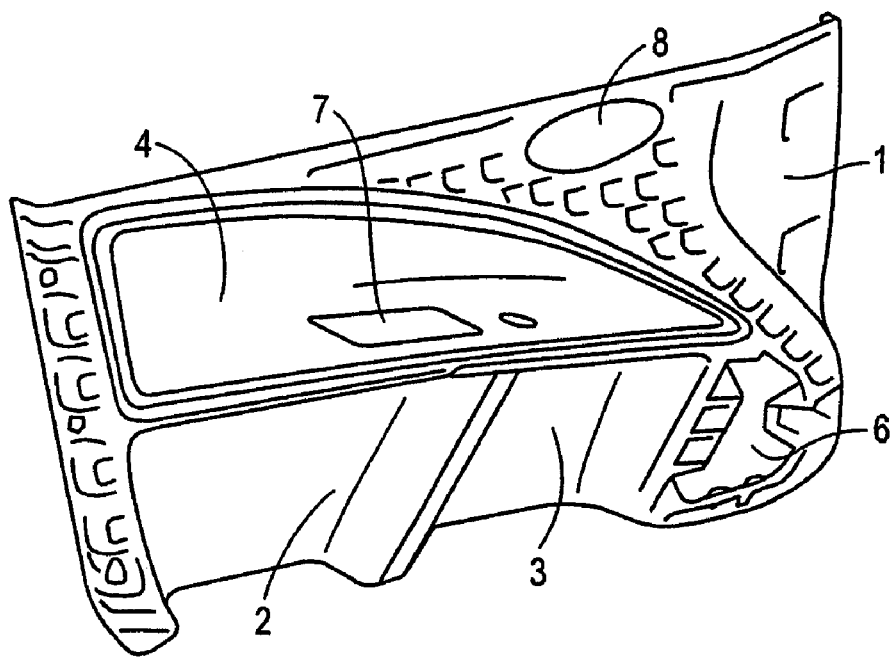
FIGS. 1(*a*) and (*b*) show, respectively, a function carrier interior shell and a corresponding outer shell which is shaped to match the function carrier interior shell.

FIG. 1*a* shows a function carrier interior shell 1 according to the present invention. In the area of the door mirror, it has decorative surfaces in the form of partial decorative layers 2, 3 and 4.

These decorative layers 2, 3, 4 are attached to the surface of the function carrier shell 1 by per se known methods, for example, laminating methods, and are part of the visible surface of the multishell interior trim part.

In addition, various openings 6, 7, 8 for speakers, window lifts or door release handles are provided in the function carrier interior shell 1.

Figure 1B:
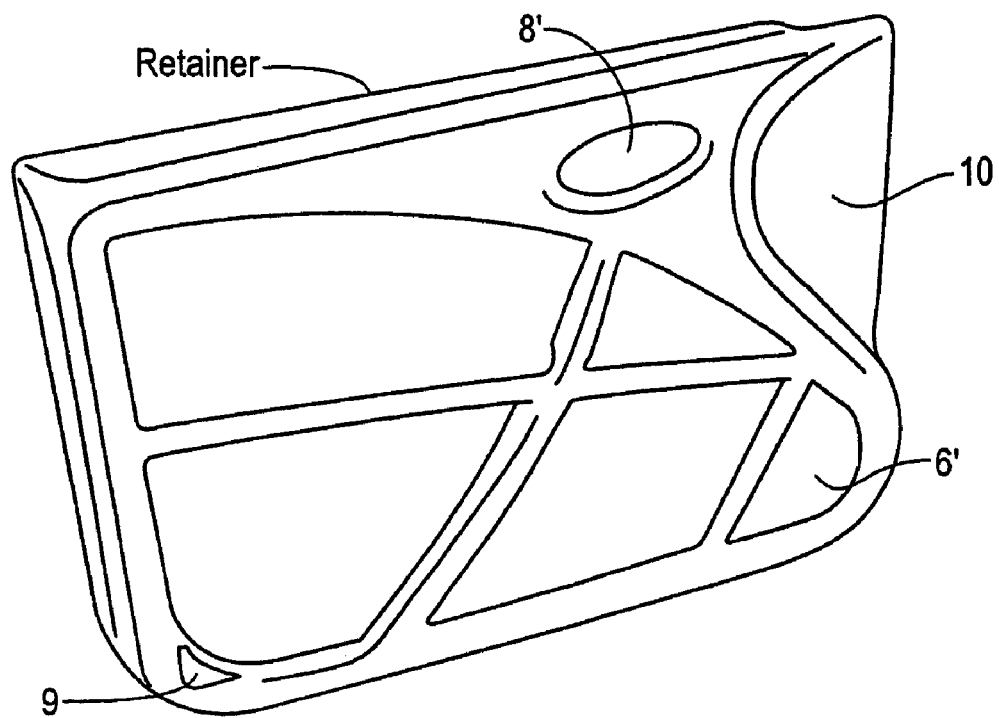

FIG. 1*b* shows a corresponding outer shell 10 which is shaped to match the function carrier interior shell 1 and has congruent openings for speakers or window lifts 6', 8'. In addition, another opening 9 is provided in the outer shell 10 for a rear reflector. Thus, the exterior shell 10 serves not only decorative functions.

In this embodiment, the area of the outer shell 10 does not cover the entire viewing surface of the function carrier interior shell 1, but leaves out the areas which are defined by the partial decorative layers 2, 3 and 4 in the function carrier interior shell 1.

Figure 2:
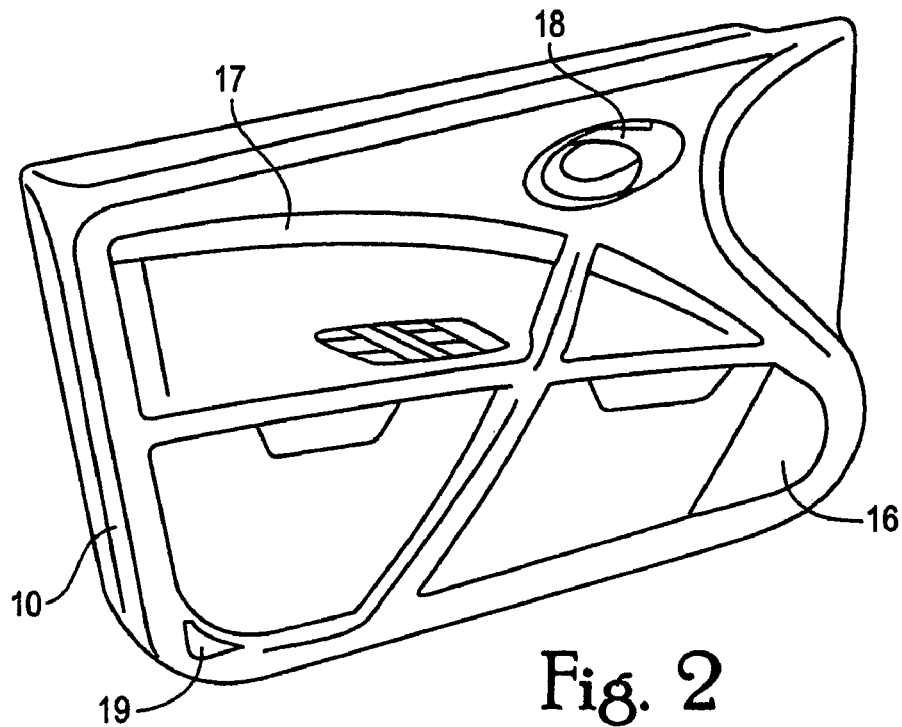
FIG. 2 shows a top view of an interior trim part for the side door of a passenger care, in which various other elements can be seen in addition to the outer shell.

FIG. 2 shows a top view of an interior trim part according to the invention for a side door of a passenger car, in which various other elements can be seen in addition to the outer shell 10. These are, for example, a speaker 16, a decorative strip 17, a door release handle 18 or a rear reflector 19. It can be seen that the window lift means are alone in the area of the partial decorative layers 2, 3, 4 of the function carrier shell. However, in the same way, wiring, lateral airbag modules, speakers, window lifts, window guide rails and/or sound/moisture absorbers may also be integrated into the function carrier interior shell. In vehicles of the prior art, EPP foam sheets are mostly bonded onto the door interior panel as combined sound/moisture absorbers using butyl adhesive beads, followed by mounting the door trim. Drawbacks of this concept are, on the one hand, the high mounting effort, and on the other hand, the low serviceability because, when repair work is done on constructional parts in the panel cavity, the insulation must be tediously detached and subsequently rebonded.

The present invention offers the possibility to create a sealing rib on the function carrier shell 1 by a corresponding ribbing (for example, through string-shaped seals or sealing beads inserted in a liquid state), which when mounted avoids the entry of water by contact with the door interior area. If sound insulations are additionally attached (bonded, clipped, mechanically hooked), which then covers the full area of the door trim within the rib. The advantage of this concept is the serviceability since the access to the panel cavity is already ensured after the door trim has been demounted.

The mounting effort can be reduced if the wiring is attached to the door interior trim rather than in the way as with prior art vehicles.

Thus, a wiring set (for example, a classical wire set or printed circuit plate (FPC=flexible print coating)) is applied to the function carrier interior shell 1 by bonding, clipping, welding or Velcro bonding. Then, when the trim is mounted to the panel, the contact with the overall power supply is made, for example, through a central plug.

Also, the lateral airbag module can be attached (screwed, welded, positive locked, bonded) directly to the function carrier interior shell 1 rather than to the door interior panel, for reducing the mounting effort, on the one hand. On the other hand, this yields functional advantages in the triggering of the airbag because certain pulsation effects are always produced between the trim and the panel, which may lead to false triggering. This can be avoided by a firm bonding to the trim.

Elements such as window lift motor and window guide rails may also be attached to the function carrier interior shell 1. However, increased forces will then act on the attachment elements, such as clips and hooks, which requires more solid attachment means. Visible screw fixtures are not desired by most automobile manufacturers for optical reasons; in this respect, the concept of the present invention offers the opportunity of screwing the function carrier interior shell 1 (with a higher load from integrated elements) in an accordingly solid way to the door interior panel, followed by mounting the outer shell on top by means of snap or Velcro bonding, virtually as a "decoration (design)" and for covering the screw sites.

By means of the present invention, particular weight advantages of the multishell interior trim parts are obtained due to low wall thicknesses of the function carrier interior shell 1 within a range of from 0.8 to 1.5 mm. In comparison, it is to be noted that usual door trims have wall thicknesses within a range of from 2 to 2.5 mm. A particularly low specific gravity of the material made of polypropylene, epoxy resin or polyurethane reinforced by natural fibers provides a light-weight construction.

Accordingly, it is particularly preferred according to the present invention to effect the double-walled design of function carrier interior shell 1 and outer shell 10 only in highly loaded areas.

In addition, the multishell interior trim parts according to the invention have advantages in terms of costs by reducing the assembling processes since no individual retainers, inset bands or mirrors must be built in. In addition, the integration of mirrors and map pockets as shown in FIG. 2 is possible without additional pressing and laminating processes.

Further, design advantages are obtained by lower radii due to the low wall thicknesses of the function carrier interior shell 1 and outer shell 10 as compared with conventionally molded supports.

Thus, by means of the present invention, it is possible without difficulty to reduce the weight of a standard door trim of a passenger car from about 3000 g by 500 g to 1000 g, depending on the concept.

In a particular embodiment of the present invention, the function carrier interior shell 1 has geometric reinforcement structures which can be seen, for example, from the recesses (wells) in FIG. 1 in the environment of the openings.

In addition to the reinforcement structures, these may define cavities, for example, honeycomb structures, wire ducts or air ducts 20 between the interior shell and the outer shell.

Figure 3:
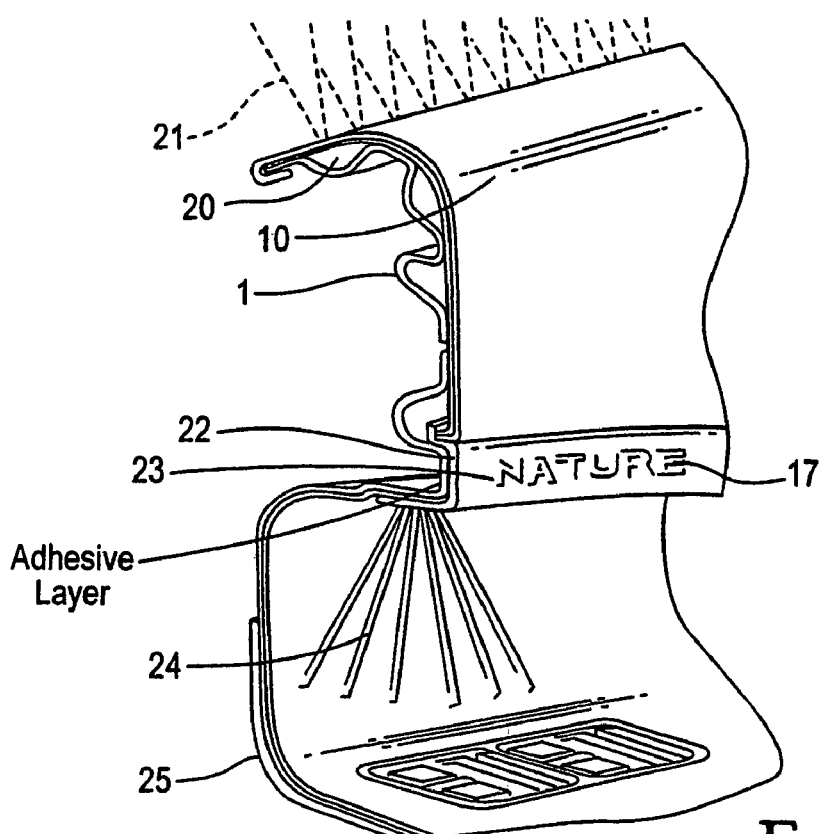
FIG. 3 further shows perforated air ducts for an aeration system for the lateral pane, which control the upper door panel temperatures or defrost the lateral panel (not shown).

FIG. 3 shows a section through a multishell interior trim part for a side door of a passenger car in which the function carrier interior shell 1 has a number of distortions which thus enable air ducts 20 or else are suitable for wires to be passed through.

FIG. 3 further shows an aeration system for the lateral pane which is possible through the air ducts 20. The air ducts 20 which are, for example, perforated, especially microperforated, in the area of the upper door trim 21 thus serve for temperature-controlling the upper door trim or may also serve for defrosting the lateral pane (not shown).

Integrated into the multishell interior trim part of FIG. 3 is the above mentioned decorative strip 17 into which an illuminated light carrier 22 with a logotype 23 may in turn be integrated. By means of such a light carrier 22, it is possible without difficulty to also provide indirect illumination, especially in the area of the window lift means (such as mirror adjusting switch, window lift etc.).

The preferably employed decorative strip 17 which is present above the visible support structure is thus an essential design element.

According to FIG. 3, in particularly highly loaded areas, the multishell interior trim part preferably has a further reinforcement element 25. The function carrier interior shell 1 can replace cost-intensive crash pads including the necessary assembling processes, especially in the case where it is provided with honeycomb structures for energy absorption. For stiffening in particularly highly loaded areas, relatively thin materials are possible as reinforcing elements 25.

All in all, it is to be noted that the improved sound insulation by hollow body structures and especially by an optionally air-permeable support material are a particular advantage in the passengers' comfort.

Accordingly, according to the invention, it is particularly preferred that the outer shell 10 covers the function carrier interior shell 1 in the upper door trim, arm rest and/or map pocket areas. This partial coverage enables the extension of the platform strategy adopted by the automobile manufacturers to the field of door trimming. A function carrier interior shell 1 can be employed for several vehicles, wherein the outer shell 10 can be adapted in an individually variable way according to the vehicle type desired. Thus, it is possible to create different outer surfaces for a vehicle, for example, for delimitation of popular, standard and comfort versions.

Preferably, the outer shell 10 also consists of polypropylene, epoxy resin or polyurethane reinforced by natural fibers, like the function carrier interior shell.

The function carrier interior shell 1 and the outer shell 10 can be bonded together by a wide variety of methods. Thus, for example, it is possible to bond the outer shell 10 alone by positive lock bonding to the function carrier interior shell 1, for example, by simple clamping or catching. In addition, friction-type bonding modes, such as welding methods or adhesive bonding, are altogether possible.

The exact wall thickness setting of the function carrier interior shell 1 and the outer shell 10 is very much geometry-dependent, so that it may be required to increase the thickness for extreme deformations.

When the attachment concept is interpreted, it should be noted that the manifestation of functional elements on visible areas of the function carrier interior shell 1 is not possible in practice for conceptual reasons. In the establishing of building part concepts, it is to be considered that limitations may exist in the freedom of design due to the molding process. Thus, for example, the creation of sharp rib structures, welding pins or screw domes is not possible in practice.

The multishell interior trim parts according to the invention are altogether capable of satisfying common testing requirements of the automobile manufacturers. This applies, in particular, to the weather cycling test, heat storage, low flammability, the emission behavior, the piercing or dart drop test, tearing out forces on the pull-out/pull-to-close grip, misuse tests with the door pocket, stiffness of the complete building part, e.g., establishing of the compression set at room temperature and elevated temperature, torsional loads, usual endurance tests and the xenon test. In addition, the multishell interior trim parts according to the invention are very much suitable for recycling, wherein the natural fibers can be employed as raw materials for a new support material.

Therefore, the multishell structure promotes the separation of different component materials.

LIST OF REFERENCE SYMBOLS

1—Function carrier interior shell
2—Partial decorative layer of the function carrier interior shell
3—Partial decorative layer of the function carrier interior shell
4—Partial decorative layer of the function carrier interior shell
5—Reinforcement
6—Opening for speaker
6'—Opening for speaker
7—Opening for window lift
8—Opening for door release handle
8'—Opening for door release handle
9—Opening for rear reflector
10—Outer shell
16—Speaker
17—Decorative strip
18—Door release handle
19—Rear reflector
20—Air duct
21—Peroration
22—Light carrier
23—Logotype
24—Illumination
25—Reinforcement element

What is claimed is:

1. A multishell interior door trim part for a side door of a passenger car comprising an outer shell, which faces the interior of the car, and a function carrier interior shell, which has attachment elements to affix it to the inside of the passenger door, an arm rest and a viewing surface facing the interior of the car, which viewing surface defines a tray area back wall in a map pocket area, wherein the function carrier interior shell is composed of a material reinforced by natural fibers selected from the group consisting of polypropylene, epoxy resin or polyurethane, and wherein the outer shell partially covers and attaches to the function carrier interior shell at selected points so as to cover the function carrier interior shell at an upper door trim, and reveal the arm rest and map pocket areas present in the function carrier shell and wherein the function carrier interior shell has a wall thickness within a range of from 0.8 to 1.5 mm.

2. The interior trim part according to claim 1, wherein the function carrier interior shell further comprises geometric reinforcement structures.

3. The interior trim part according to claim 2, wherein the reinforcement structures, interior shell and outer shell define cavities.

4. The interior trim part according to claim 3, wherein the cavities function as air ducts.

5. The interior trim part according to claim 4, wherein the outer shell and air ducts have perforations.

6. The interior trim part according to claim 1, wherein the outer shell is composed of reinforced material selected from the group consisting of polypropylene, epoxy resin and polyurethane.

7. The interior trim part according to claim 1, wherein attachment is selected from positive lock bonding, welding or adhesive.

8. The interior trim part according to claim 1, wherein the outer shell further comprises bolt on parts selected from door release handles, door handles, mirror adjusting means or window lifts.

9. The interior trim part according to claim 1, wherein the attachment elements selected from retainers with clips or inset bands.

10. The interior trim part according to claim 3, wherein the defined cavities are selected from the group consisting of honeycomb structures, wire ducts and air ducts.

11. The interior trim part according to claim 5, wherein the perforation is a microperforation.

12. The interior trim part according to claim 1, wherein the function carrier inner shell bears items selected from the group consisting of lateral airbag modules, sound absorbers, moisture absorbers, window lift motors, speakers, wiring and window guide rails.

* * * * *